Jan. 15, 1929.
C. A. B. HALVORSON, JR
1,699,108
MOTION PICTURE PROJECTOR
Filed Sept. 18, 1924
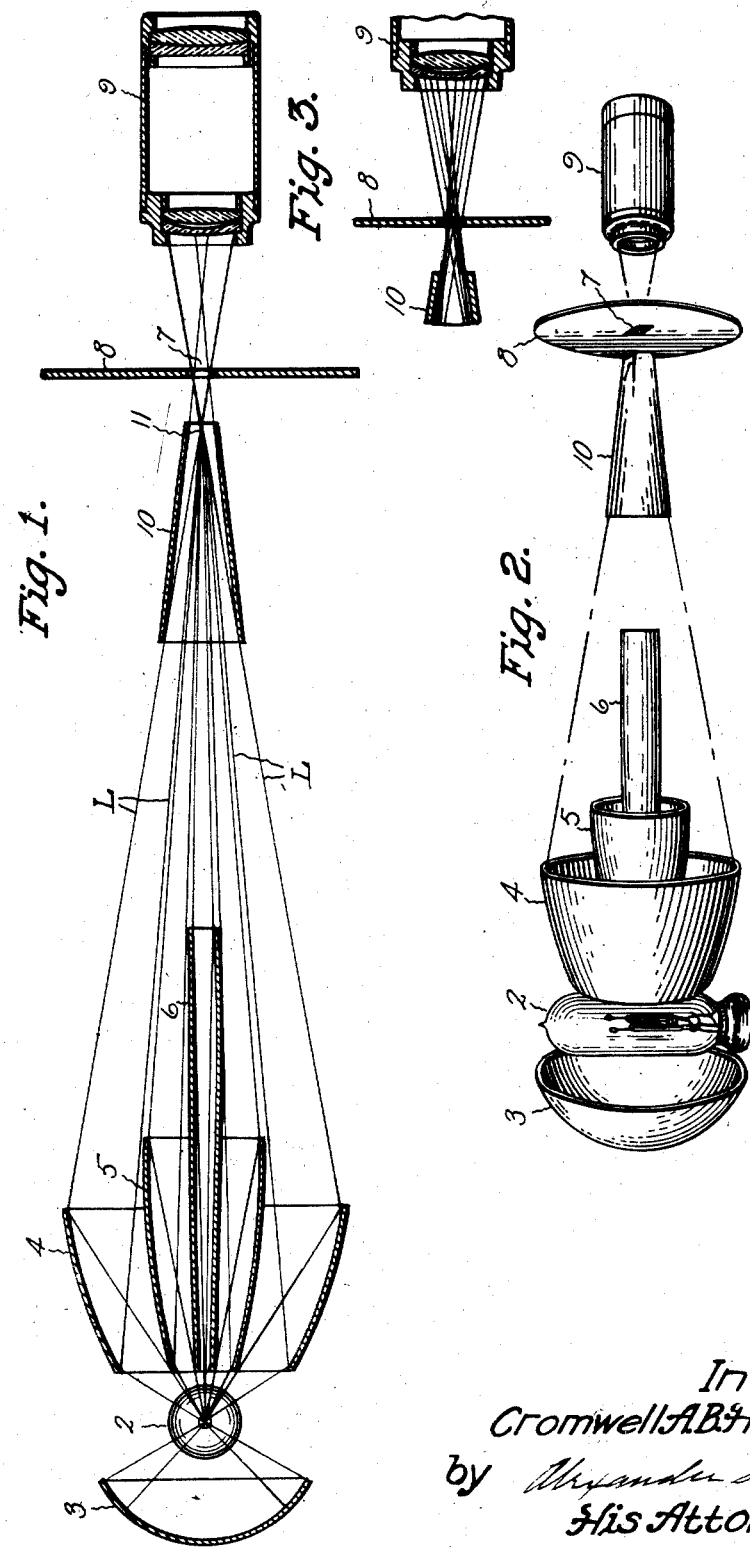
Inventor,
Cromwell A.B.Halvorson,Jr.
by
His Attorney.

Patented Jan. 15, 1929.

1,699,108

UNITED STATES PATENT OFFICE.

CROMWELL A. B. HALVORSON, JR., OF LYNN, MASSACHUSETTS, ASSIGNOR TO GENERAL ELECTRIC COMPANY, A CORPORATION OF NEW YORK.

MOTION-PICTURE PROJECTOR.

Application filed September 18, 1924. Serial No. 738,507.

My invention relates to projectors, and in particular to the type adapted for motion pictures.

Heretofore efforts have been made to increase the amount of light collected by the objective lens in a motion picture device by increasing the intensity of the light source and also by increasing the size of the condensing lens.

However, lenses of this character are expensive and sometimes crack.

It is an object of my invention to substitute for such lenses reflectors of a suitable construction for directing light to the aperture in the aperture plate and to the objective lens. The invention will be more fully understood from the following specification and claims.

In the drawing, Fig. 1 is a plan view in section of the projector; Fig. 2 shows the projector in perspective; Fig. 3 shows the displacement of the foci near the aperture plate.

Referring more in detail to the drawing, there is shown in Fig. 1 the lamp 2 of the type used in the usual motion picture machine. Back of the lamp 2 there is located a spherical reflector 3. In front of the light source there is located, in place of the usual condenser lens, a nest of three ellipsoidal reflectors 4, 5 and 6 all of which have a common focal point which falls within the limits of the lamp 2. All light from the light source 2 and from the reflector 3 that strikes the nest is reflected by the reflectors 4, 5 and 6 toward the aperture 7 in the aperture plate 8, as indicated by the rays L.

Beyond the aperture 7 is located the object lens 9. Just in front of the aperture plate there is located a conical reflector 10, the object of which is to redirect certain of the rays L, toward the aperture which rays otherwise would be lost against the aperture plate.

In Fig. 1 the rays are all shown reflected toward the conjugate foci 11 in the neighborhood of the aperture 7. However, the conjugate foci need not so coincide inasmuch as the reflectors may be so designed that the foci may fall at different points along the optical axis as indicated in Fig. 3. The object in thus having the conjugate foci displaced is to spread the rays in order to avoid streaks and images on the screen which screen is located as usual to the right of the objective lens 9 but which is not shown in the drawing.

The reflectors in the nest are so located as to have a common axis coincident with the optical axis of the device.

While I have described my invention in connection with certain specific embodiments, it will be understood I contemplate variations which readily suggest themselves in view of the disclosure and which fall within the scope of the claims herein.

What I claim as new and desire to secure by Letters Patent of the United States, is:

1. In combination in a projection device, a source of light, an aperture plate with an aperture therein, and an object lens, said source, aperture and lens being all located in line along the optical axis of the device, and a nest of reflectors, said reflectors being all ellipsoidal and located wth their axes coincident and with one focal point coincident, one set of focal points being located within the region about the light source and the conjugate focal points being located in proximity and in front of the aperture, said lens being located behind said aperture whereby rays of light from the light source that strike the said reflectors are reflected and are caused to converge toward the conjugate focal point near the aperture, and thereafter to pass through the aperture and through said lens, said reflectors all being open toward the light source and toward the aperture, the openings toward the light source being located in a common plane transverse the axis of the device.

2. In a projector in combination, an aperture plate, a spherical reflector, a light source located in the focal region of the reflector, said reflector being located to one side of a plane passing through the focal point transverse the axis of the reflector, said reflector subtending a solid angle the apex of which is located at the focal point of the reflector, a nest of ellipsoidal reflectors all located to one side of said focal plane opposite that of the spherical reflector, said nest subtending a solid angle the apex of which is located at the said focal point, each of said nested reflectors having a focal point in said light source and all of the reflectors in the projector having a common axis passing through said light source, said axis passing also through said aperture plate, said nested reflectors being truncated and each having a small opening and a large opening, all of the small openings being nearer the light source than the large openings, the said subtended angles being substantially the same whereby the light reflected by the spherical reflector is caught by the nested reflectors.

3. In a projector in combination, an aperture plate, a spherical reflector, a light source located in the focal region of the reflector, said reflector being located to one side of a plane passing through the focal point transverse the axis of the reflector, said reflector subtending a solid angle the apex of which is located at the focal point of the reflector, a nest of ellipsoidal reflectors all located to one side of said focal plane opposite that of the spherical reflector, said nest subtending a solid angle the apex of which is located at the said focal point, each of said nested reflectors having a focal point in said light source and all of the reflectors in the projector having a common axis passing through said light source, said axis passing also through said aperture plate, said nested reflectors being truncated and each having a small opening and a large opening, all of the small openings being nearer the light source than the large openings, the said subtended angles being substantially the same, the outer ellipsoidal reflector subtending the outer zone of the solid angle covered by the nest and each one of the ellipsoidal reflectors in succession subtending a zone of the same solid angle in succession whereby the light reflected by the spherical reflector is caught by the nested reflectors and redistributed through the aperture plate.

In witness whereof, I have hereunto set my hand this 13th day of September, 1924.

CROMWELL A. B. HALVORSON, Jr.